US006966318B1

(12) United States Patent
Tsuug et al.

(10) Patent No.: US 6,966,318 B1
(45) Date of Patent: Nov. 22, 2005

(54) FILTERING MASK

(75) Inventors: Sun-Ming Tsuug, Taipei (TW);
Chin-Hsiang Chang, Sansing Township, Yilan County (TW)

(73) Assignee: Chang Gung University, Tao-Yuan (TW)

( * ) Notice: Subject to any disclaimer, the term of this patent is extended or adjusted under 35 U.S.C. 154(b) by 0 days.

(21) Appl. No.: 10/919,556

(22) Filed: Aug. 17, 2004

(51) Int. Cl.[7] ..................... A61M 16/00; A61M 15/08; B01D 50/00
(52) U.S. Cl. ........................... 128/206.11; 128/207.18; 55/484; 55/DIG. 35
(58) Field of Search .................. 128/200.27, 200.28, 128/200.29, 201.13, 201.15, 201.17, 201.25, 128/201.27, 201.28, 204.11, 204.12, 204.13, 128/204.26, 205.25, 205.27–205.29, 206.11, 128/206.15–206.18, 206.21, 207.12, 207.18, 128/207.16; 55/DIG. 33, DIG. 35, 484, 482, 55/495

(56) References Cited

U.S. PATENT DOCUMENTS

| 443,191 | A | * | 12/1890 | Illing | 128/203.22 |
|---|---|---|---|---|---|
| 533,854 | A | * | 2/1895 | Loeb | 128/200.11 |
| 706,015 | A | * | 8/1902 | Breen | 128/206.15 |
| 1,221,246 | A | * | 4/1917 | Travers | 128/206.11 |
| 1,691,648 | A | * | 11/1928 | Drager | 128/205.27 |
| 4,200,092 | A | * | 4/1980 | Warncke et al. | 128/202.26 |
| 6,684,882 | B1 | * | 2/2004 | Morine | 128/206.11 |

* cited by examiner

Primary Examiner—Teena Mitchell
(74) Attorney, Agent, or Firm—Alan D. Kamrath; Nikolai & Mersereau, P.A.

(57) ABSTRACT

A filtering mask includes two filtering bodies with a tube connected therebetween. Two sub-tubes on the tube are inserted in the wearer's nostrils. Each filtering body includes two chambers separated by a separation plate through which through holes are defined. One of the chambers is connected to the tube by a sealing pad which can be opened in one direction, and the other chamber includes a filtering member for filtering air coming from outside. The through holes are controlled by a sealing pad, which can be opened when inhaling and closed when exhaling.

6 Claims, 8 Drawing Sheets

FILTERING MASK

FIELD OF THE INVENTION

The present invention relates to a filtering mask having two wedge-shaped bodies with filter screen and valve means for providing fresh air into a tube connected to a nose.

BACKGROUND OF THE INVENTION

A conventional filtering mask is generally made by a thick fabric which can only filter large particles in the air and does not satisfy the requirement of general users. Some filtering masks include active carbons sandwiched between two layers of fabrics of the conventional filtering mask so as to filter small particles in the air. Nevertheless, the conventional filtering masks cannot totally avoid air that does not pass through the filter to be inhaled by the wearers. Although there are several kinds of filtering masks in the market that function well, they are expensive, heavy and uncomfortable to wear. For the motorcyclists who are exposed to polluted air, the filtering masks have to be light, easy to wear, less expensive and efficient. Unfortunately, there are no suitable filtering masks that meet the requirements.

The present invention intends to provide a filtering mask that includes two filtering bodies for providing filtered air to the wearers and that is easy to wear.

SUMMARY OF THE INVENTION

The present invention relates to a filtering mask that comprises a tube connected between two filtering bodies. Two sub-tubes extend from the tube so as to be inserted in the wearer's nostrils. Each filtering body has a base with a separation plate connected thereto so as to define a first chamber and a second chamber, wherein the first chamber is enclosed by a first wall and the second chamber is enclosed by a second wall. A plurality of through holes are defined through the separation plates and a first seal pad is located in the first chamber and attached to the separation plate. The first seal pad may seal or unseal the through holes by a pressure difference between the first chamber and the second chamber. The first wall includes a first opening connected with the tube and a second opening. A second seal pad is attached to an outside surface of the first wall and seals or unseals the second opening. Two filtering members are, respectively, engaged with the two respective second chambers.

The present invention will be clearer from the following description when taken in connection with the accompanying drawings, which show, for purposes of illustration only, a preferred embodiment in accordance with the present invention.

DETAILED DESCRIPTION OF THE PREFERRED EMBODIMENT

Referring to FIGS. 1 to 4, the filtering mask of the present invention comprises a tube portion 1 including a tube 10 and two sub-tubes 11 extending from the tube 10, and two filtering bodies 2, respectively, connected to two ends of the tube 10. Each filtering body 2 has a base with a separation plate 205 connected therein so as to define a first chamber 203 and a second chamber 204 separated by the separation plate 205. The first chamber 203 is enclosed by a first wall 201, and the second chamber 204 is enclosed by a second wall 202. A plurality of through holes 206 are defined through the separation plate 205, and two first seal pads 207 are located in the first chamber 203 and attached to the separation plate 205. The first seal pads 207 can be opened when inhaling and closed to seal the through holes 206 when exhaling. The control of the first seal pads 207 is made by the pressure difference between the first chamber 203 and the second chamber 204. The first wall 201 includes a first opening 208 with a connection port 210 so as to be connected with the tube 10. A second opening 209 is defined in the first wall 201, and a second seal pad 211 is attached to an outside surface of the first wall 201 and capable of sealing or unsealing the second opening 209. A cover 22 is engaged with the first chamber 203.

Figure 1:
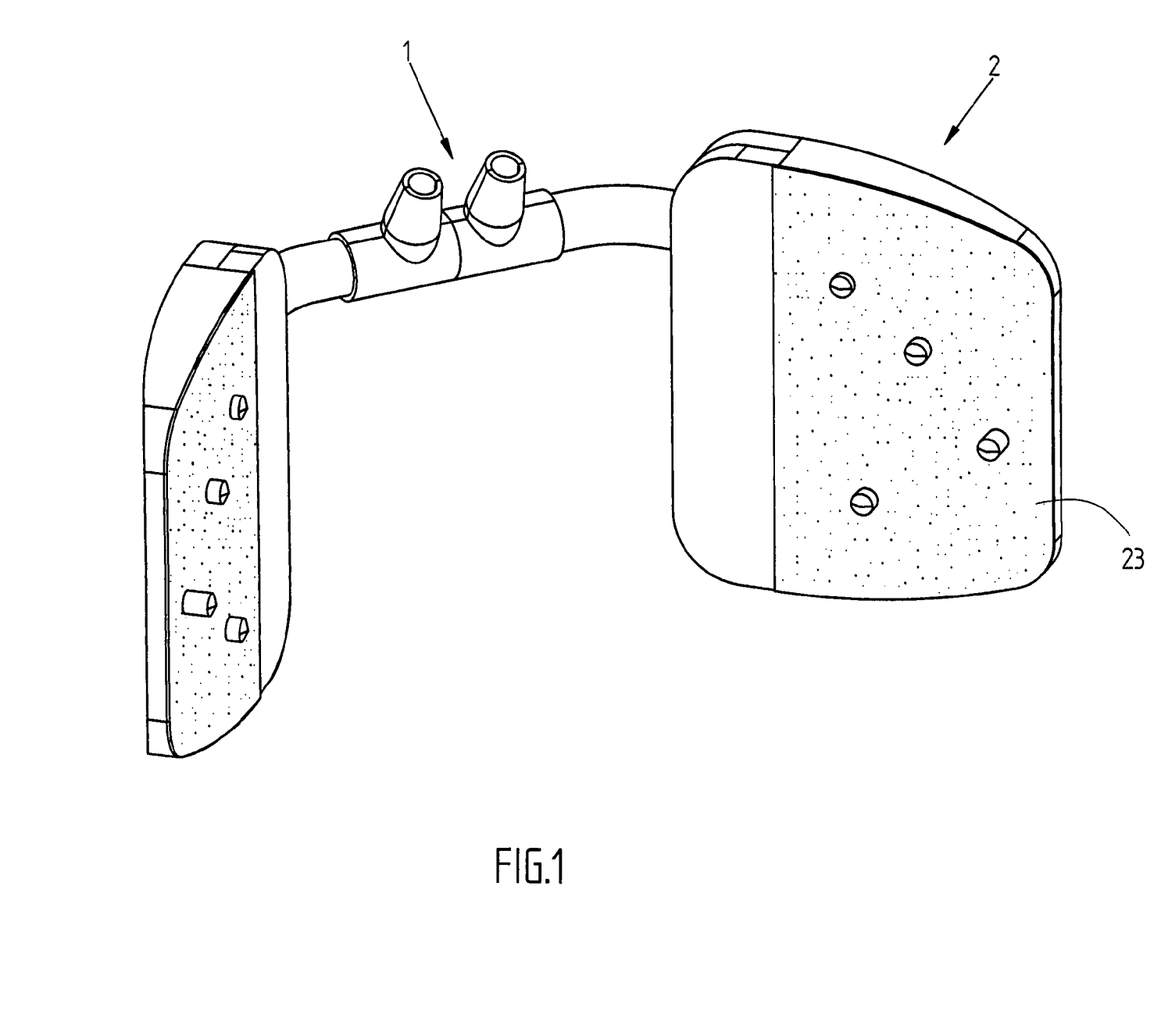
FIG. 1 is a perspective view of the filtering mask of the present invention.
Figure 2:
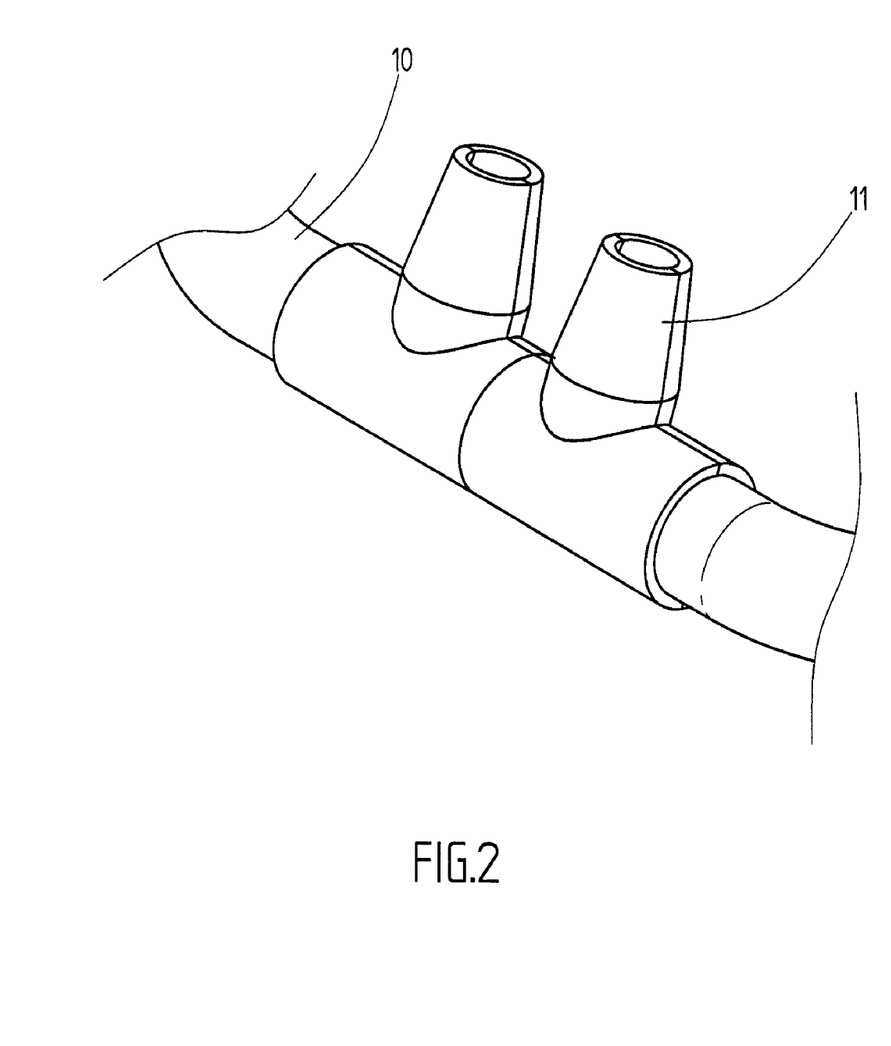
FIG. 2 shows the tube portion of the filtering mask of the present invention.
Figure 3:
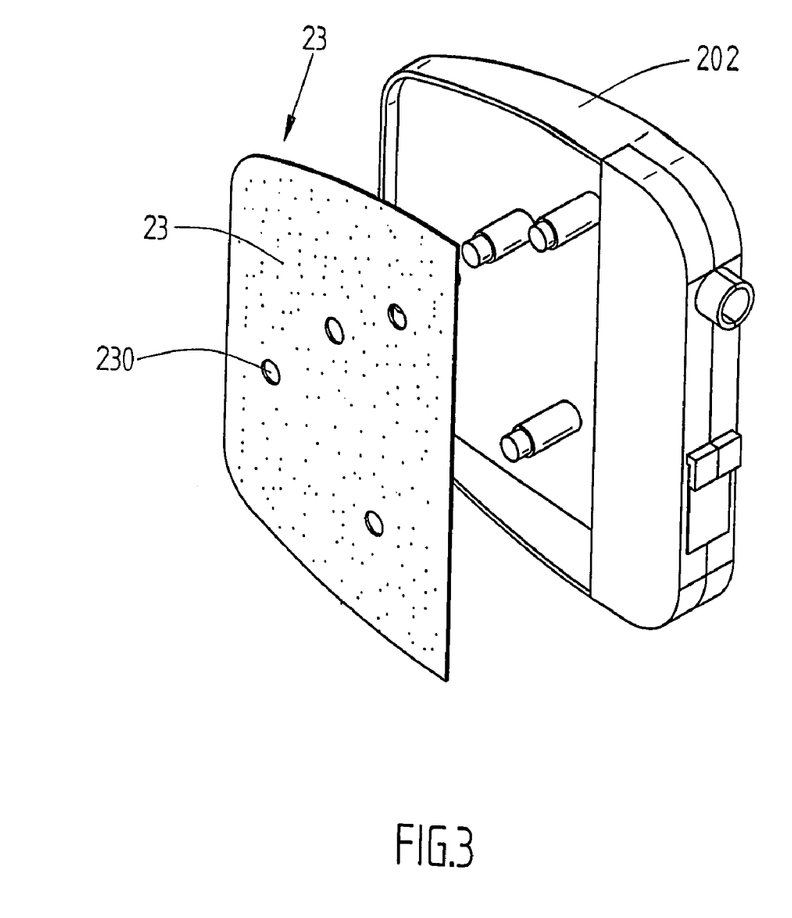
FIG. 3 is an exploded view of the filtering member and the filtering body of the filtering mask of the present invention.
Figure 4:
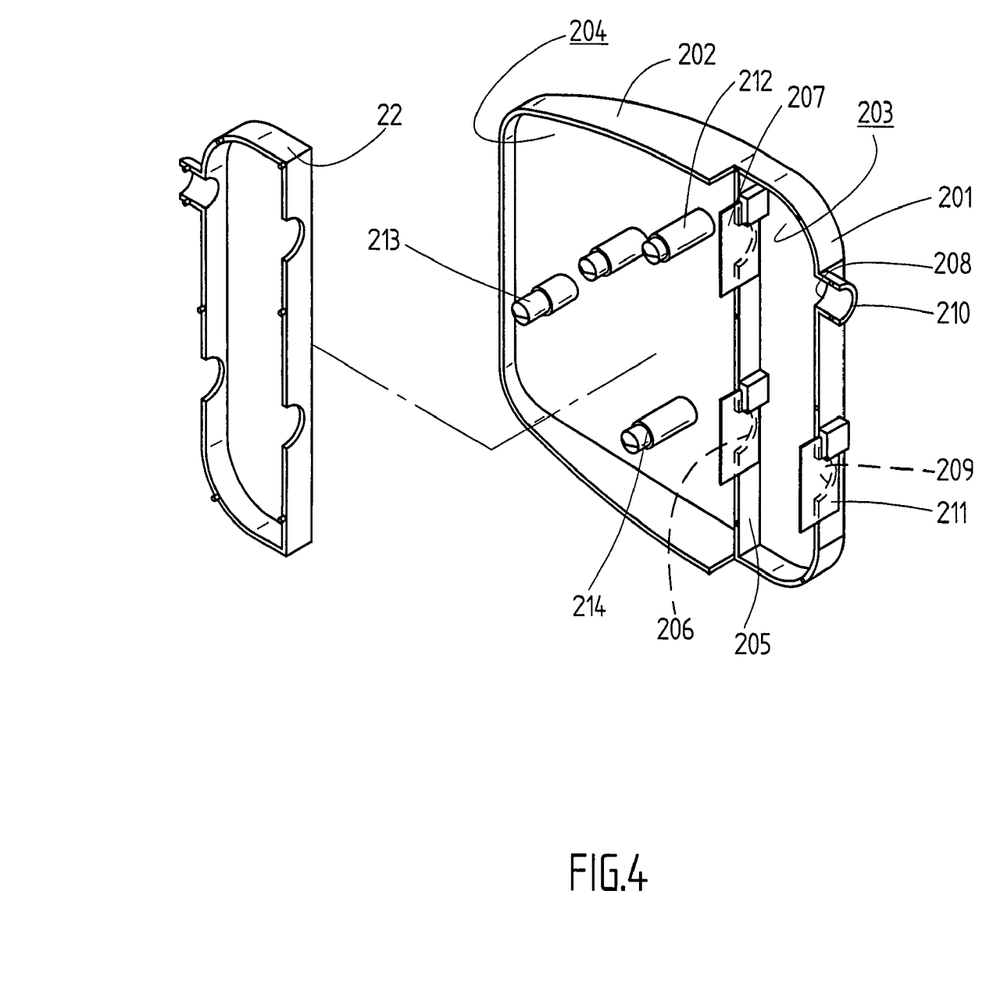
FIG. 4 is an exploded view of the cover and the filtering body of the filtering mask of the present invention.

A plurality of positioning rods extend from an inside surface of the second chamber 204. Each positioning rod includes a first section 212 and a second section 213 which extends from a free end of the first section 212 so as to form an annular shoulder 214 due to the different diameters of the first and second sections 212, 213. A filtering member 23 has positioning holes 230 through which the second sections 213 extend, and the filtering member 23 is rested on the annular shoulders 214.

Figure 7:
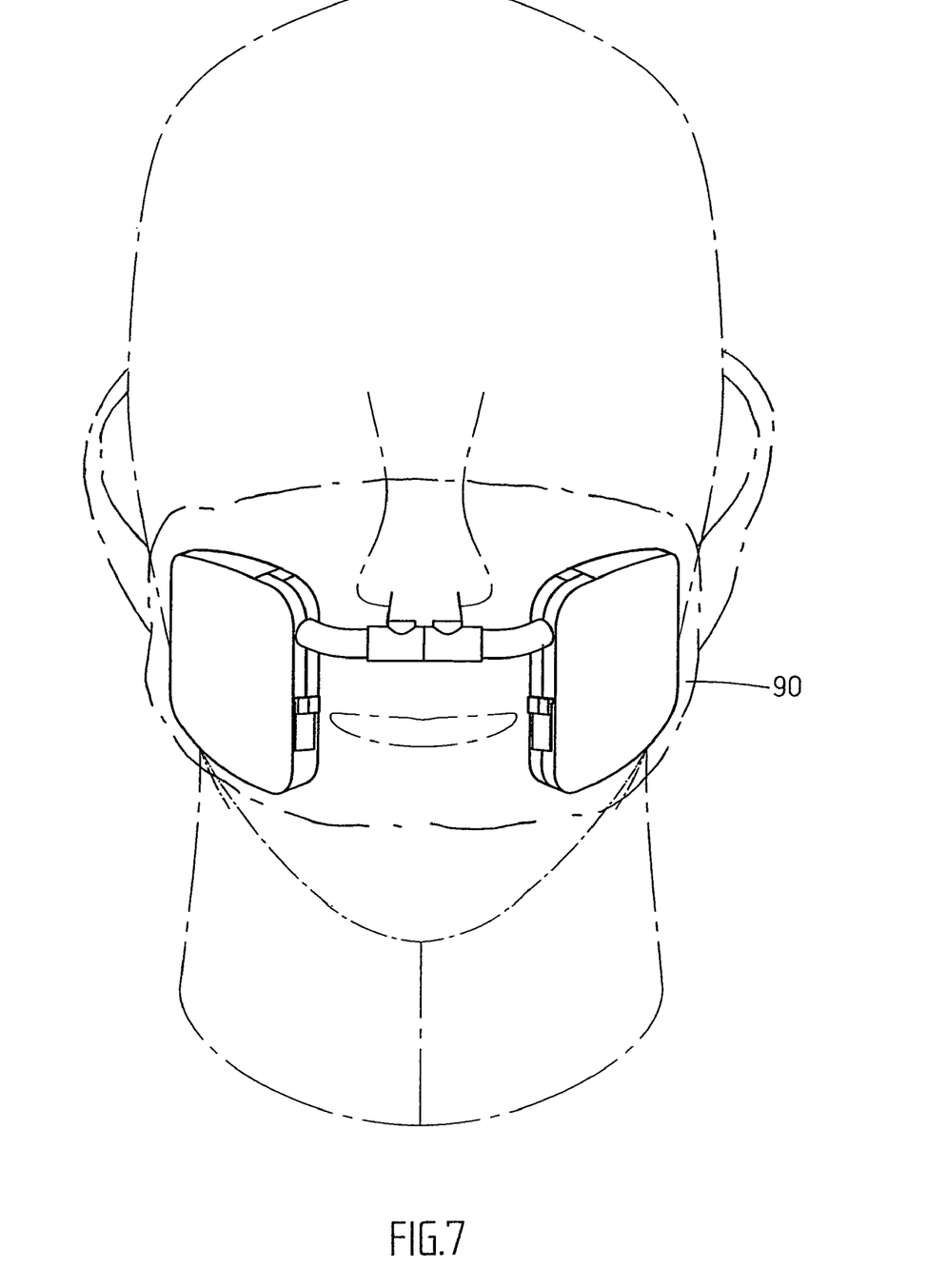
FIG. 7 shows a wearer wearing the filtering mask of the present invention.

As shown in FIG. 7, each of the filtering bodies 2 is a wedge-shaped member, and the thickness of the free end of the filtering body 2 is thinner than the thickness of the end of the filtering body 2 connected with the tube 10. Therefore, when wearing the filtering mask, the thinner portions of the filtering bodies 2 are located on the cheeks and close to the ears. The second sections 213 extending through the positioning holes 230 stimulate the skins profile on the cheeks so as to make space for inhaling air to flow through and chill the cheeks. An outer mask 90 includes two ear loops which can be tied to the ears of the wearer, and the mask 90 covers the two filtering bodies 2 and the tube 10 to improve the appearance.

Figure 5:
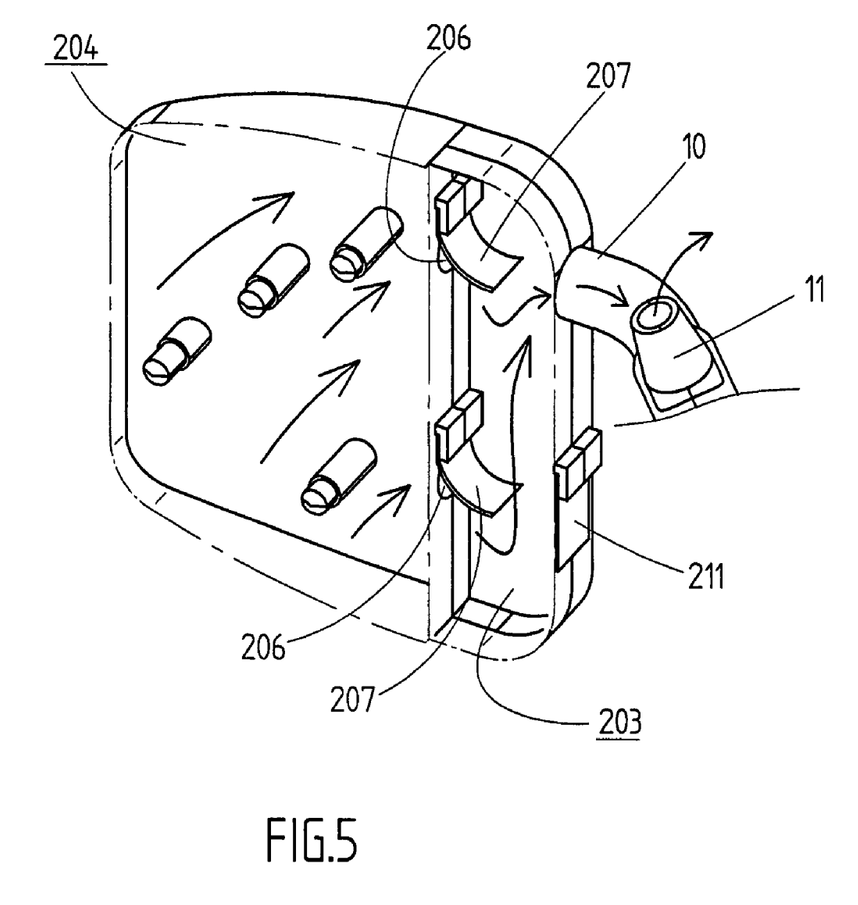
FIG. 5 shows the first sealing pads opened and the second sealing pad closed when inhaling.
Figure 6:
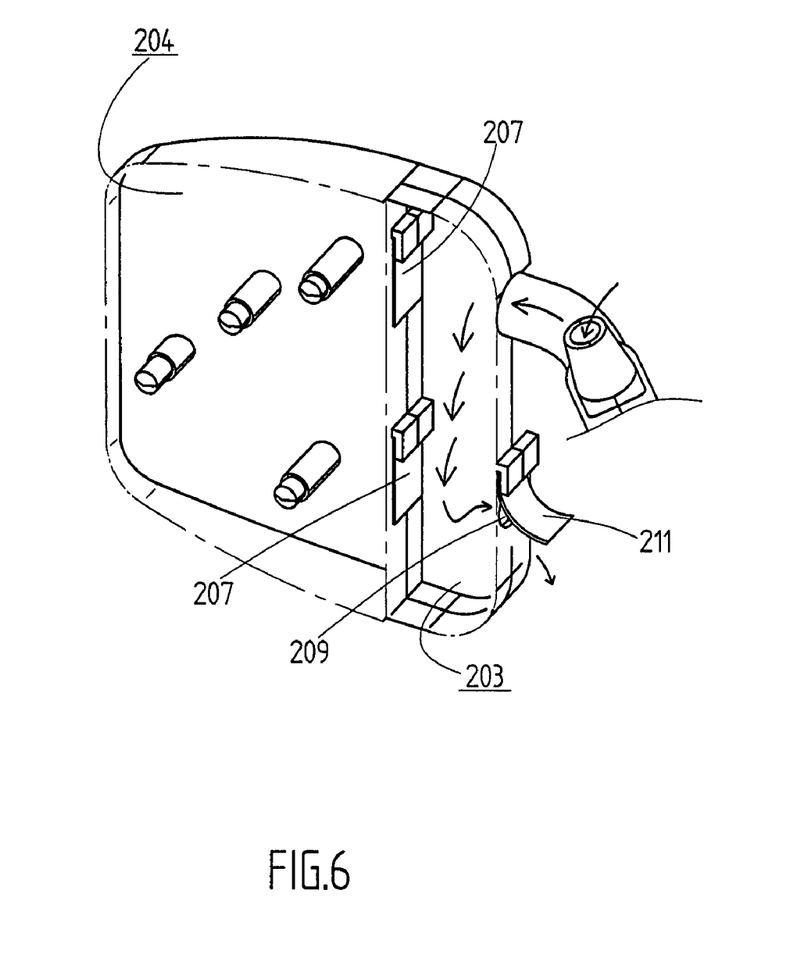
FIG. 6 shows the first sealing pads closed and the second sealing pad opened when exhaling.
Figure 8:
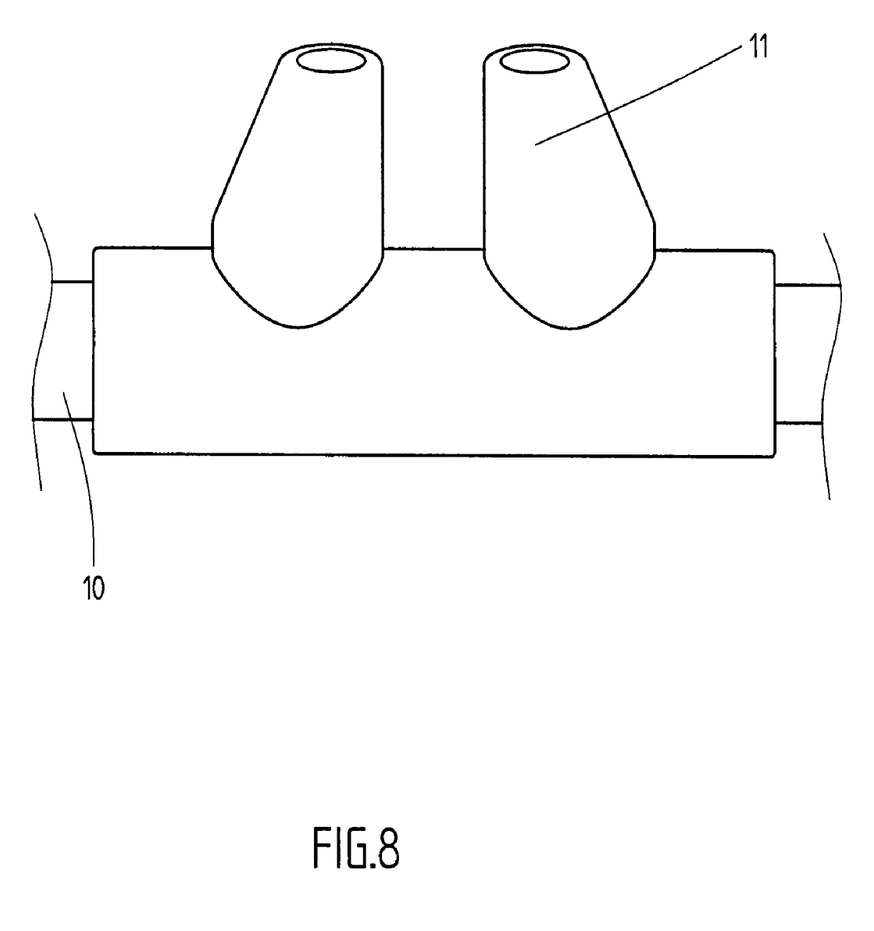
FIG. 8 shows the trapezoid sub-tubes of the present invention.

As shown in FIG. 5, when inhaling, air is sucked to go through the filtering members 23, and the two first seal pads 207 are opened because the first chamber 203 is a negative-pressure space. Then, the filtered air can be inhaled via the tube 10 and the sub-tubes 11. As shown in FIG. 6, when exhaling, the air exhales from the sub-tubes 11 and the tube 10 and enters into the first chamber 203. The second chamber 204 is a negative-pressure space so that the two first seal pads 207 are closed, the second seal pad 211 is opened and the outgoing air is released to outside. As shown in FIG. 8, each of the two sub-tubes 11 has a trapezoid outer profile. The distance between the two open tops of the two sub-tubes 11 is smaller than the two respective root portions of the two sub-tubes 11 so that the sub-tubes 11 can be used for different sizes of nostrils of users.

While we have shown and described the embodiment in accordance with the present invention, it should be clear to those skilled in the art that further embodiments may be made without departing from the scope of the present invention.

What is claimed is:

1. A filtering mask comprising:
    a tube portion including a tube and two sub-tubes extending from the tube; and
    two filtering bodies, respectively, connected to two ends of the tube, with each filtering body comprising: a base with a separation plate connected therein so as to define a first chamber and a second chamber, the first chamber enclosed by a first wall and the second chamber enclosed by a second wall, a through hole defined through the separation plate, a first seal pad located in the first chamber and attached to the separation plate, the first seal pad capable of sealing or unsealing the through hole by pressure difference between the first chamber and the second chamber, the first wall including a first opening connected with the tube and a second opening, a second seal pad attached to an outside surface of the first wall and capable of sealing or unsealing the second opening, and a filtering member engaged with the second chamber.

2. The filtering mask as claimed in claim 1 further comprising a plurality of positioning rods extending from an inside of the second chamber of each of the filtering bodies, with the filtering member secured to the plurality of positioning rods.

3. The filtering mask as claimed in claim 2, wherein each positioning rod includes a first section and a second section extending from a free end of the first section so as to form an annular shoulder, with the filtering member having positioning holes through which the second sections of the plurality of positioning rods extend.

4. The filtering mask as claimed in claim 1, wherein each of the filtering bodies is a wedge-shaped member having a thickness, a first end and a free end, wherein the thickness of the free end of the filtering body is thinner than the thickness of the first end of the filtering body, with the first end having the first opening connected with the tube.

5. The filtering mask as claimed in claim 1 further comprising an outer mask covering the two filtering bodies and the tube.

6. The filtering mask as claimed in claim 1, wherein each of the two sub-tubes has a trapezoid outer profile.

* * * * *

UNITED STATES PATENT AND TRADEMARK OFFICE
CERTIFICATE OF CORRECTION

PATENT NO. : 6,966,318 B1
DATED : November 22, 2005
INVENTOR(S) : Ming-Tsung Sun and Chin-Hsiang Chang It is certified that error appears in the above-identified patent and that said Letters Patent is hereby corrected as shown below:

Title page,
Item [12], delete "Tsuug et al." and substitute -- Sun et al. --.
Item [75], Inventors delete "Sun-Ming Tsuug" and substitute -- Ming-Tsung Sun --.

Signed and Sealed this

Twenty-eighth Day of February, 2006

JON W. DUDAS
*Director of the United States Patent and Trademark Office*